Nov. 6, 1928.  1,690,660
E. O. ADKINS
REPAIR STAND FOR ENGINES, TRANSMISSIONS, AND THE LIKE
Filed March 10, 1926    5 Sheets-Sheet 1
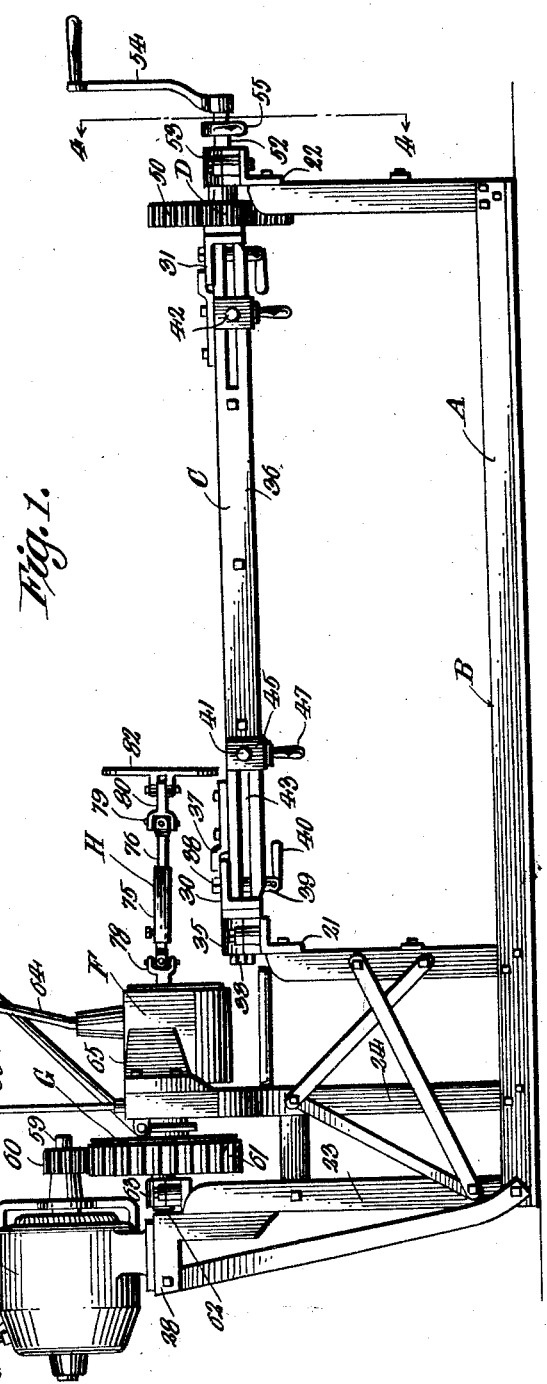
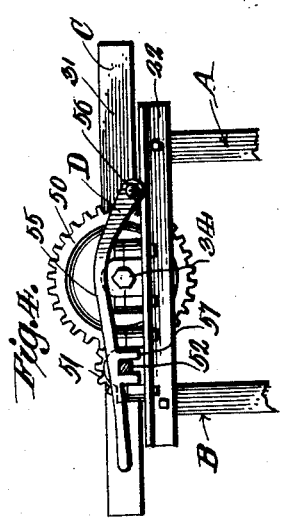
Inventor
ELBA O. ADKINS
WITNESSES
By
Attorney

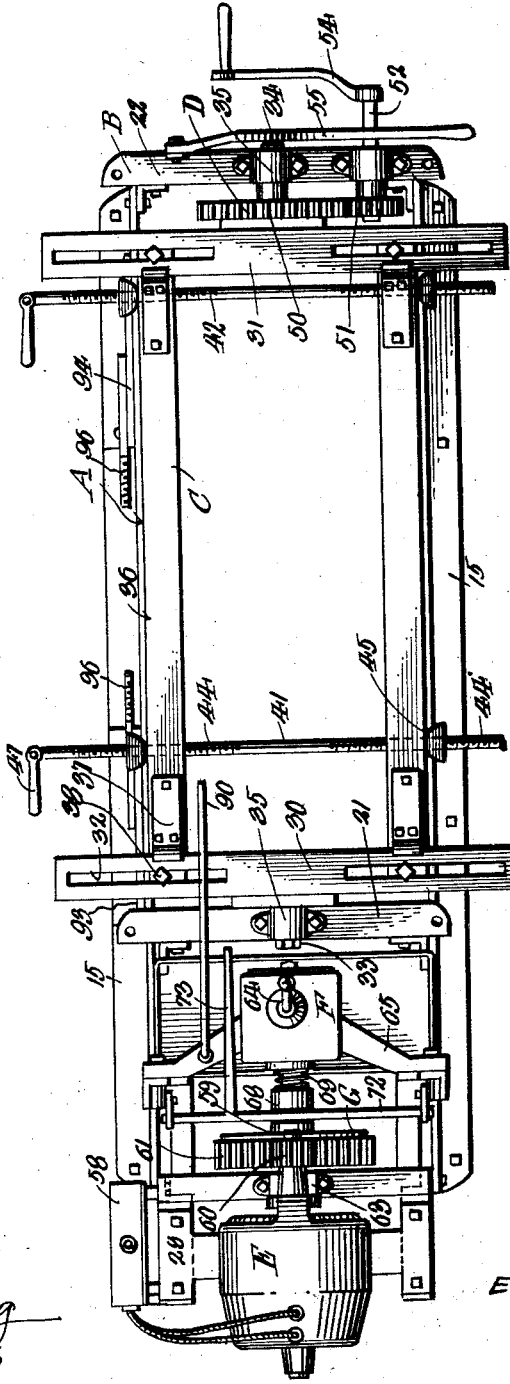

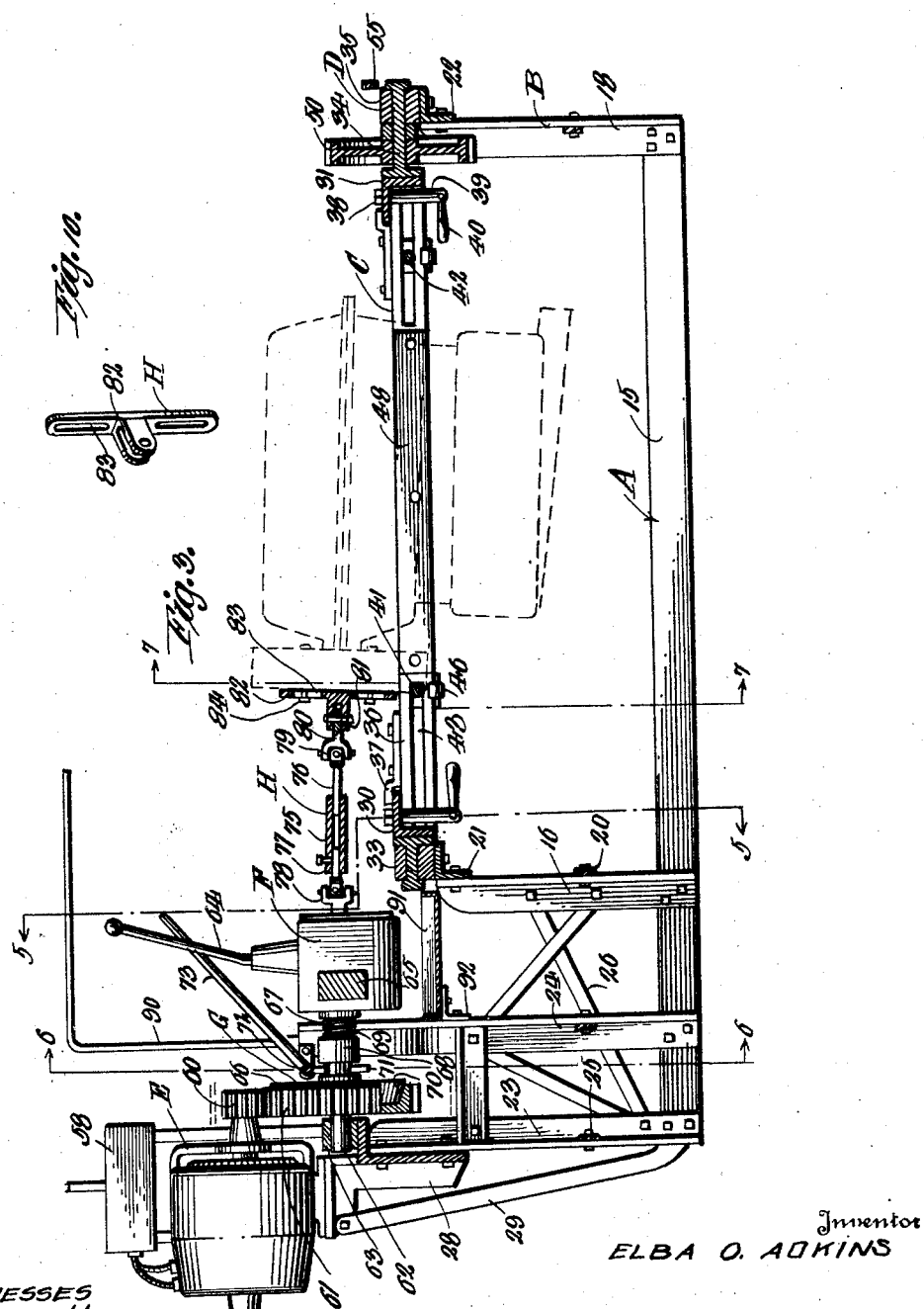

Nov. 6, 1928.
E. O. ADKINS
1,690,660
REPAIR STAND FOR ENGINES, TRANSMISSIONS, AND THE LIKE
Filed March 10, 1926    5 Sheets-Sheet 4
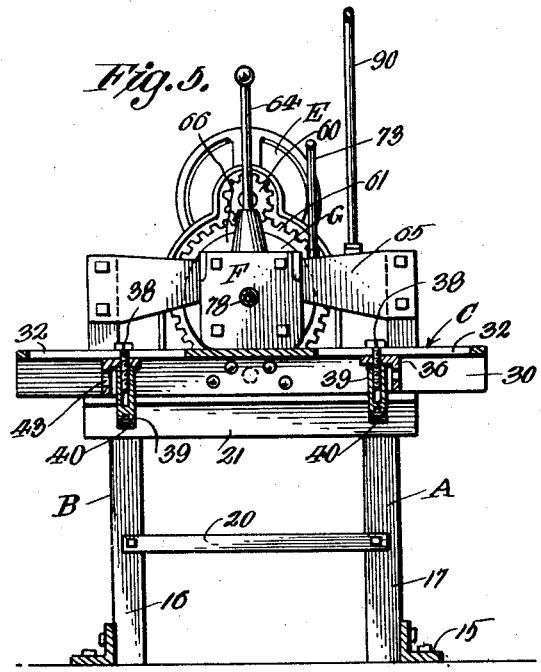
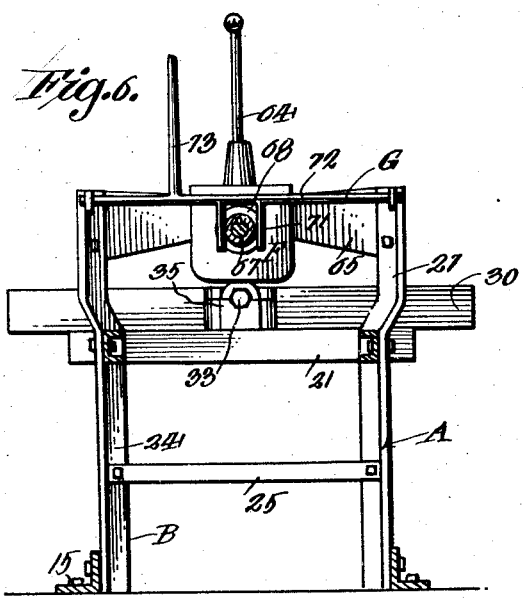
Inventor
ELBA O. ADKINS Nov. 6, 1928.
E. O. ADKINS
1,690,660
REPAIR STAND FOR ENGINES, TRANSMISSIONS, AND THE LIKE
Filed March 10, 1926 5 Sheets-Sheet 5
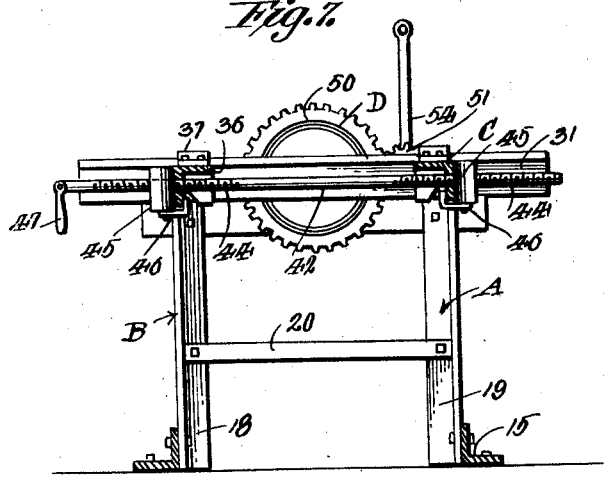
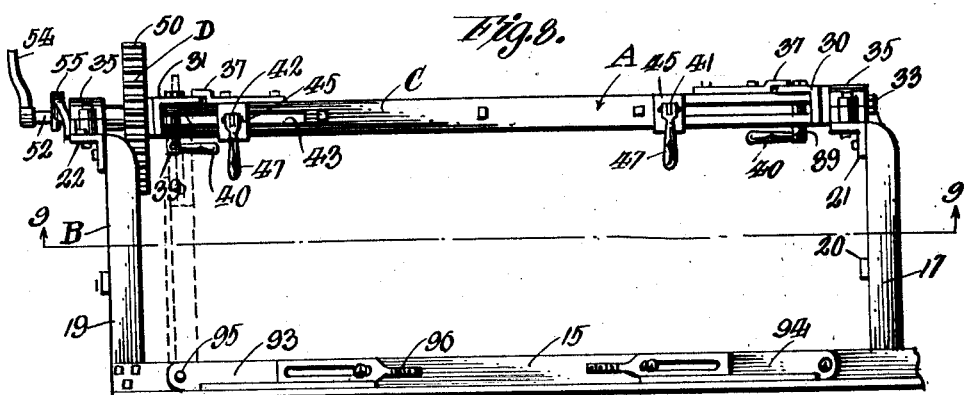
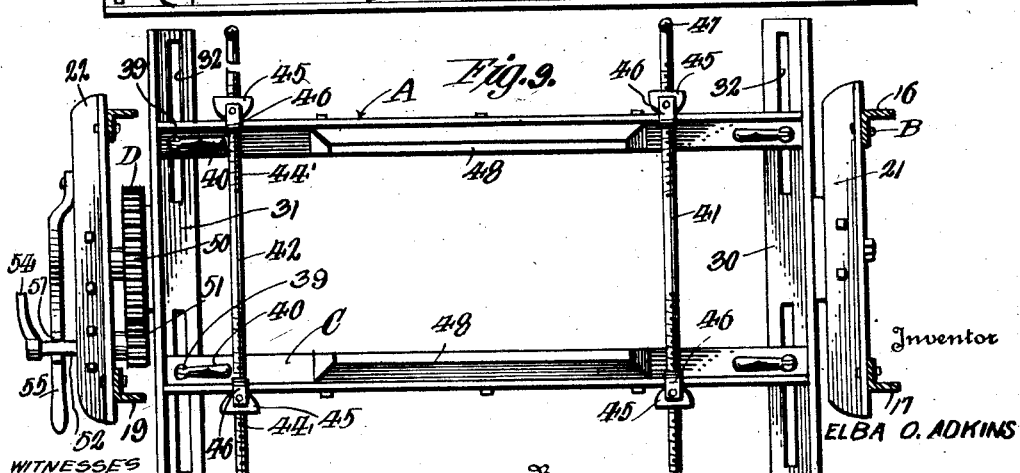
Inventor
ELBA O. ADKINS Patented Nov. 6, 1928.

1,690,660

UNITED STATES PATENT OFFICE.

ELBA O. ADKINS, OF HUNTINGTON, WEST VIRGINIA, ASSIGNOR OF ONE-HALF TO THE HUNTINGTON AUTO SUPPLY COMPANY, OF HUNTINGTON, WEST VIRGINIA, A CORPORATION OF WEST VIRGINIA.

REPAIR STAND FOR ENGINES, TRANSMISSIONS, AND THE LIKE.

Application filed March 10, 1926. Serial No. 93,814.

This invention appertains to a novel device for repairing and rebuilding internal combustion engines, transmissions and differentials of motor vehicles.

The primary object of the present invention is to provide a novel repair stand embodying a novel cradle for receiving the engine or like apparatus to be operated upon, with novel means for turning the crade so as to hold the engine or apparatus being operated upon in the desired position, thereby permitting the expeditious repairing and rebuilding of all parts thereof without difficulty on the part of the operator.

Another object of the invention is to provide novel means for constructing the cradle whereby the engine can be firmly held therein against accidental displacement, the cradle being adjustable for holding various sizes and kinds of apparatus.

A further object of the invention is to provide novel means for rotating the cradle in the stand and for locking the cradle in any desired adjusted position.

A further object of the invention is to provide a novel repair stand for engines including means for clamping the engine in place and novel means for continuously rotating the crank shaft of the engine at different speeds while the same is being held in place, whereby new bearings fitted on the shaft can be worn in prior to the fitting of the engine in the vehicle.

A further object of the invention is to provide a novel means for connecting the transmission shaft to the fly wheel of the engine being rebuilt, whereby to permit different sizes and types of engines to be acted upon irrespective of the position of the cradle on the stand.

A further object of the invention is to provide a novel means for incorporating a clutch on the stand, whereby the drive means for the transmission can be disconnected therefrom at any desired time.

A still further object of the invention is to provide a device of the above character which will be easily operated and which is of an exceptionally strong and durable character and occupy a minimum amount of space in a repair shop.

With these and other objects in view, the invention consists in the novel construction, arrangement and formation of parts as will be hereinafter more specifically described, claimed, and illustrated in the accompanying drawings, in which drawings:

Figure 1 is a side elevation of the improved device,

Figure 2 is a top plan view of the same,

Figure 3 is a longitudinal section through the device taken on the line 3—3 of Figure 2, Figure 4 is a transverse section taken on the line 4—4 of Figure 1 looking in the direction of the arrows illustrating the novel means for holding the cradle in an adjusted position against swinging movement, Figure 5 is a transverse section through the device taken on the line 5—5 of Figure 3 looking in the direction of the arrows illustrating the formation of the cradle and the driving means for the transmission, Figure 6 is a transverse section taken on the line 6—6 of Figure 3 looking in the direction of the arrows illustrating the formation of the supporting frame and the means for operating the clutch for connecting the transmission with the driving means, Figure 7 is a transverse section taken on the line 7—7 of Figure 3 looking in the direction of the arrows illustrating the novel means employed for adjusting the cradle clamping bars, Figure 8 is a fragmentary side elevation of the device showing the opposite side from that illustrated in Figure 1, Figure 9 is a horizontal section taken on the line 9—9 of Figure 8 looking in the direction of the arrows showing the cradle in bottom plan, Figure 10 is a detail perspective view of the means utilized for connecting the universal drive shaft of the trasmission with the fly wheel of the engine.

Referring to the drawings in detail, wherein similar reference characters designate corresponding parts throughout the several views the letter A generally indicates the improved device, which comprises a novel supporting frame or stand B, a cradle of novel construction C for receiving the work, an adjusting means D for the cradle, a prime mover E for operating the crank shaft of an engine held by the cradle, a transmission F for varying the speed of the prime mover E, a clutch G for connecting the drive engine or prime mover E with the transmission F, and the novel means H for operatively connecting the transmission F with the crank shaft of the engine being operated upon.

The novel supporting frame or stand B comprises longitudinally extending base bars 15, which can be formed of angle iron and which have bolted or otherwise secured thereto upright supporting legs 16, 17, 18 and 19. The legs 16 and 17 are arranged in transverse alinement and are disposed inward of the rear ends of the base bars 15. The legs 18 and 19 are also arranged in transverse alinement and are secured to the extreme forward ends of the bars. These legs mentioned form means for supporting the cradle C and the operating means D therefor, as will be hereinafter more fully described. These legs can be braced in any preferred way, such as by transverse brace bars 20. The upper ends of the bars 16 and 17 have bolted or otherwise secured thereto a transverse supporting frame bar 21, while the legs 18 and 19 have secured to their upper ends a similar transverse frame bar 22. These bars can be also formed of angle iron if desired. The base bars 15 beyond the legs 16 and 17 also have bolted thereto pairs of transversely alined legs 23 and 24, which as shown are also constructed of angle iron. The pairs of legs 23 and 24 are braced by transverse straps 25 and can be further braced by diagonal straps 26 certain of which are bolted to the legs 16 and 17. The pairs of legs 23 and 24 extend above the legs 16 and 17 and form means for supporting respectively, the prime mover E, the clutch G, and the transmission F, as will be hereinafter more fully described. It is to be noted however, that the upper ends of the pair of legs 24 have their upper ends bowed outwardly as at 27 and that the upper terminals of the pair of legs 23 have bolted thereto a bracket 28 on which the prime mover E is in turn secured. This bracket extends rearwardly of the upper ends of the pair of legs 23 and is braced by suitable supporting arms 29 carried by or secured to the base bars 15.

The novel cradle C comprises a pair of transversely extending spaced parallel end bars 30 and 31 which are preferably constructed of angle iron, with their upper flanges arranged in a horizontal plane and provided with longitudinally extending slots 32. The vertical flanges of the bars 30 and 31 at their transverse centers have secured thereto laterally extending stub shafts 33 and 34, which shafts are arranged at the longitudinal axis of the supporting frame or stand B. The transverse supporting frame bars 21 and 22 carry longitudinally alined bearings 35 in which are rotatably mounted the stub shafts 34 and 33 and it is to be noted that the stub shaft 34 is of a greater length than the stub shaft 33. Arranged between the cradle end bars 30 and 31 are the longitudinally extending cradle side bars 36, which are also formed of angle iron. The horizontal flanges of the cradle side bars 36 are arranged under the horizontal flanges of the end bars 30 and 31 and the ends of the side bars 36 have bolted or otherwise secured thereto guides 37 for engaging the upper faces of the end bars 30 and 31. The side bars 36 are adjustable toward or away from each other for gripping an engine or the like therebetween and these bars 36 are held in an adjusted position by means of bolts 38 which extend through the slots 32 in the end bars 30 and 31 and openings in the side bars 36. These bolts 38 have threaded thereon tightening nuts 39 provided with suitable operating handles 40 which may be pivotally connected thereto. In order to permit the expeditious adjusting of the side bars 36 transversely extending adjusting shafts 41 and 42 are provided. These shafts 41 and 42 extend through suitable slots 43 formed in the vertical flanges of the said side bars 36 and the opposite ends of these shafts are provided with right and left hand threads 44 and 44' respectively on which are threaded travelling nuts 45. These nuts have their inner faces of substantially a semi-spherical shape for rocking engagement with the outer faces of the side bars 36, and each nut carries a bracket 46 for engaging the said side bars and these brackets 46 are in the nature of hooks engaging under the said side bars. The shafts 41 and 42 can be moved toward and away from one another owing to the slots 43 which extend longitudinally of the bars. The outer ends of the shafts 41 and 42 have pivotally connected thereto suitable manipulating handles 47 so as to permit the rotation of the shafts and the desired movement of the nuts 45 toward and away from one another. Owing to the arrangement of the adjusting shafts and the side bars 36 the side bars can be adjusted at different angles relative to one another to conform somewhat to the shape of the apparatus being held thereby. The inner faces of the side bars 36 inward of the slots 43 have secured thereto clamping blocks 48 which can, if desired, be made of wood. The blocks 48 can be of any desired shape best suited for the particular purpose intended.

When an engine is clamped in the cradle the same can be readily moved to varying positions by simply turning the cradle C, so as to allow all parts of the engine to be readily operated upon. This adjusting means D comprises a relatively large spur gear wheel 50 which is keyed or otherwise secured to the stub shaft 34 and this gear 50 meshes with a drive pinion 51 keyed or otherwise secured to a counter shaft 52 arranged in parallel relation to the stub shaft at one side thereof. The counter shaft 52 is rotatably mounted in a suitable bearing 53 carried by the end frame bar 22 and a portion of the said counter shaft which extends beyond the frame bar 22 is of a polygonal shape in cross section for a purpose, which will now be described. The polygonal end of the stub shaft 52 is adapted to receive an operating crank 54 whereby upon turning movement of the crank rotary movement will be imparted to the cradle. The cradle can be held in adjusted position by the use of a suitable latch lever 55 which is pivotally secured at one end, as at 56 to the frame bar 22. This latch lever 55 carries depending lugs 57 for engaging the polygonal portion of the shaft 52 and it is obvious that when the latch lever is thrown downward rotary movement of this shaft will be prevented.

The prime mover E utilized for turning the crank shaft of an internal combustion engine held by the cradle, when it is desired to fit new bearings on the crank shaft can be of any desired type. As shown this prime mover consists of an electric motor of the desired horse power, which is bolted directly to the bracket 28. A control box 58 can be mounted at one side of the bracket 28 for the prime mover E for controlling the flow of current to the motor. The prime mover E includes the armature shaft 59 having a drive pinion 60 keyed or otherwise secured thereto. This drive pinion 60 meshes with a relatively large spur gear wheel 61 which is keyed to a stub shaft 62 rotatably carried by a bearing 63 at the longitudinal axis of the frame or stand B. This bearing 63 is bolted to the bracket 28 as shown in Figure 3 of the drawings.

In order to vary the speed of rotation of the crank shaft of the engine being acted upon the transmission F is provided. This transmission F is of any desired conventional construction and is provided with the usual lever 64 for bringing about the operation of the speed gears in the transmission. The transmission F has connected thereto suitable brackets or laterally extending supporting arms 65 which are bolted or otherwise secured to the bowed ends 27 of the pair of legs 24.

In order to connect the transmission F with the prime mover E the clutch G is provided. This clutch G embodies a sliding clutch disk 66 feathered on the transmission shaft 67. This disk is carried by a suitable hub 68 which is engaged by a spring 69 coiled about the transmission shaft and this spring normally urges the disk 66 into engagement with a clutch face 70 formed in the spur gear 61. A yoke 71 fits within an annular groove formed in the hub 68 and this yoke is carried by a transversely extending operating shaft 72 rockably supported by the upper ends of the bowed arms 27 of the legs 24. A suitable handle or crank 73 is provided for rocking the said shaft 72 and for consequently operating the clutch.

The speed shaft of the transmission F carries the novel means H for permitting the connection of the transmission F with the crank shaft of the engine being acted on and this novel means H comprises a sleeve 75 of polygonal shape in cross section which slidably receives a shaft section 76 at the forward end thereof. The rear end of the sleeve slidably receives a shaft section 77 and this shaft section 77 is connected by a universal joint 78 with the speed shaft of the transmission. The shaft section 76 is connected by a universal joint 79 with a shaft section 80, which is in turn bolted or otherwise connected, as at 81 to a cross head 82. This cross head 82 is provided with longitudinally extending slots 83 for the reception of bolts 84, to permit the same to be connected to varying sizes of fly wheels. Referring to Figure 3 of the drawings an internal combustion engine is shown clamped in place by the cradle C, in such a position as to permit the bearings of the crank shaft to be replaced. It can be seen, that owing to the construction of the connection H that irrespective of the distance of the engine from the transmission or the position thereof one side or the other of the longitudinal axis of the stand or frame B, that the crank shaft can be readily connected to and operated from the transmission.

In the use of the device, the engine block or the like to be repaired or tested, is disposed within the cradle in the manner illustrated in Figure 3 of the drawings, in broken lines, and between the clamping blocks 48 of the side bars 36, and the threaded shafts 41 and 42 are then rotatably adjusted so as to effect a firm clamping engagement of the blocks 48 against the opposite sides of the engine block or the like. When new bearings are being fitted in an engine the cradle is turned so as to expose the crank shaft, which will allow the bearings to be readily removed and new bearings placed in position. After the bearings have been replaced it is merely necessary to connect the head 82 with the fly wheel of the engine and to set the motor E into operation. The clutch G is now operated and the transmission is moved into low gear. This will allow the rotation of the crank shaft at a relatively low speed and as the bearings become worn in the bearing bolts can be taken up and the speed of the crank shaft advanced by the transmission. This allows the bearings to be thoroughly worn in before the engine is again associated with the chassis of the automobile. When new pistons or piston rings are placed in the engine the same can also be worn in by utilizing the motor E.

The device is capable of any number of uses, that will readily suggest themselves to skilled automobile mechanics and the device is also particularly adapted for use in connection with rebuilding transmissions, differentials and the like.

If preferred, a lamp standard 90 can be detachably associated with one of the supporting arms or brackets 65, so that light can be thrown directly on the work.

The base bars 15 of the frame B can also be bolted to the floor of the work shop or other suitable support, if desired, so as to prevent rocking of the device when the same is in use.

It is also preferred to associate tool pans with the device at different convenient points and as shown in Figure 3 of the drawings I have connected a tool pan 91 to the frame B directly below the transmission F. This pan can be held in place by suitable brackets 92.

In some instances, especially in extra heavy work, it may be advisable to provide extra supports for the cradle C and for such a contingency swinging arms 93 and 94 are pivotally connected as at 95 to one of the base bars 15. These arms can be swung to an upright raised position and have slidably associated therewith threaded shanks 96, which can be pushed through the slots 32 in the bars 30 and 31 of the cradle. Suitable clamping nuts can then be threaded upon the shanks.

Changes in details may be made without departing from the spirit or scope of this invention, but:

What I claim as new is:

1. A device for repairing and rebuilding machinery comprising a supporting frame, a cradle mounted in said frame including end bars and longitudinally extending clamping bars, means adjustably connecting the longitudinal bars with the end bars, adjusting means for adjusting the longitudinal bars to clamp the work between them, means rotatably connecting the end bars with the supporting frame, and means for varying the angular position of the cradle with respect to the frame.

2. A device for repairing and rebuilding machinery comprising a supporting frame, a cradle mounted in said frame including a pair of spaced longitudinally extending end bars having slots extending longitudinally thereof, longitudinally extending side bars extending between the end bars, means carried by said side bars for clamping engagement with the opposite sides of the work, guides carried by the side bars engaging the end bars, means carried by the side bars and extending through the slots in the end bars for clamping the side bars in positions of adjustment on said end bars, the side bars being provided with longitudinally extending slots, adjusting rods extending through the last mentioned slots, nuts threaded upon said rods engaging the outer faces of the side bars, means connecting the nuts with the side bars, means for rotating said rods to effect feeding of the nuts thereon and adjustment of the side bars through the movement of the nuts, means rotatably connecting the cradle with the frame, and means for varying the angle of the cradle.

3. A device of the character described comprising a supporting frame, end bars mounted for rocking movement in the frame and each provided with a pair of slots, longitudinally extending work-clamping bars slidably mounted on the end bars, bolts carried by the longitudinal bars and mounted for adjustable clamping engagement in the slots of said end bars, a transversely arranged threaded shaft operatively associated with the longitudinal bars for moving the same toward and away from each other into and out of clamping engagement with the work disposed between the same, and work-engaging blocks mounted upon the longitudinal bars for engagement with the work.

4. A device of the class described comprising a supporting frame, end bars mounted for rocking adjustment within the frame and each provided with a pair of slots, longitudinally extending work-clamping bars slidably mounted at their ends upon the end bars, clamping bolts carried by the longitudinal bars and adjustable in the slots of said end bars to clamp the longitudinal bars after adjustment thereof, a threaded shaft extending between the work-clamping bars and at its ends through said bars, nuts mounted upon the shaft and bearing against the said bars, and means for rotating said shaft whereby to effect feeding of the nuts and clamping adjustment of the said work-clamping bars.

In testimony whereof I affix my signature.

ELBA O. ADKINS.